(12) United States Patent
Walters (10) Patent No.: US 11,793,171 B2
(45) Date of Patent: Oct. 24, 2023

(54) APPARATUS THAT ENABLES A LEASH TO COIL AROUND AN ANIMAL'S COLLAR

(71) Applicant: Shed Defender, LLC, Yuba City, CA (US)

(72) Inventor: Tyson Walters, Yuba City, CA (US)

(73) Assignee: Shed Defender, LLC, Yuba City, CA (US)

( * ) Notice: Subject to any disclaimer, the term of this patent is extended or adjusted under 35 U.S.C. 154(b) by 213 days.

(21) Appl. No.: 17/302,267

(22) Filed: Apr. 29, 2021

(65) Prior Publication Data

US 2021/0337770 A1 Nov. 4, 2021

Related U.S. Application Data

(63) Continuation-in-part of application No. 17/076,558, filed on Oct. 21, 2020, now Pat. No. 11,589,557.

(60) Provisional application No. 63/019,833, filed on May 4, 2020.

(51) Int. Cl.
*A01K 27/00* (2006.01)

(52) U.S. Cl.
CPC .......... *A01K 27/004* (2013.01); *A01K 27/005* (2013.01)

(58) Field of Classification Search
CPC .... A01K 27/004; A01K 27/005; A01K 27/00; A01K 27/001; A01K 27/002; A01K 27/003; A41F 9/00; A41F 9/02; A41F 9/002; A41F 1/008; B60P 7/0846
See application file for complete search history.

(56) References Cited

U.S. PATENT DOCUMENTS

| | | | |
|---|---|---|---|
| 2,799,245 | A | 7/1957 | Ruggiero et al. |
| 4,328,767 | A | 5/1982 | Peterson |
| 4,584,967 | A | 4/1986 | Taplin |
| 6,499,437 | B1 | 12/2002 | Sorenson et al. |
| 6,694,922 | B2 | 2/2004 | Walter et al. |
| 7,150,247 | B2 | 12/2006 | Eulette et al. |

(Continued)

FOREIGN PATENT DOCUMENTS

| | | | |
|---|---|---|---|
| CA | 2950607 A1 | | 6/2018 |
| DE | 202019002986 U1 | * | 9/2019 |

(Continued)

OTHER PUBLICATIONS

International Search Report and Written Opinion for PCT/US21/70487 dated Jul. 28, 2021.
U.S. Pat. No. 887,072, A, May 12, 1908, Delaney.

*Primary Examiner* — Kristen C Hayes
(74) *Attorney, Agent, or Firm* — Brian Roffe (57) ABSTRACT

Apparatus to enable an elongate leash to coil, when not in use, around an animal's neck while attached to the animal's collar includes retainers each including a polarized magnet and first and second parts that have an at least partly separated state that enables placement of the leash between the parts at any one of a plurality of different, user-selectable locations along a length of the leash and an engaged state in which the parts are fixed to the leash at a user-selected location along the length of the leash. The retainers are configured, with respect to the polarity of the magnets therein, to enable them to magnetically couple to one another and provide the leash with a coiled state around the animal's neck. The leash has an extended, use state in which the magnets in the retainers are not magnetically coupled to one another.

21 Claims, 8 Drawing Sheets

(56) References Cited

U.S. PATENT DOCUMENTS

| | | | |
|---|---|---|---|
| 7,281,495 B2 | 10/2007 | Wagner | |
| 7,389,750 B1 | 6/2008 | Rogers et al. | |
| 7,461,615 B2 | 12/2008 | Albright | |
| 8,841,556 B2 | 9/2014 | Rothbaum | |
| 8,978,593 B2 | 3/2015 | Catena | |
| 9,066,500 B2 | 6/2015 | Talley | |
| 9,179,647 B2 | 11/2015 | Lambert | |
| 9,549,536 B2 | 1/2017 | Soto | |
| 9,599,145 B2 | 3/2017 | Durfee | |
| 9,961,882 B2 | 5/2018 | Woods | |
| 10,117,421 B2 | 11/2018 | Durfee | |
| 10,231,439 B2 | 3/2019 | Woods | |
| 10,258,855 B1* | 4/2019 | DiMartino | A63B 71/06 |
| 11,084,415 B2* | 8/2021 | Laarmann | B60P 7/0846 |
| 11,589,557 B2* | 2/2023 | Walters | A01K 27/005 |
| 2004/0155738 A1* | 8/2004 | Kraus | G04B 37/1486 |
| | | | 335/205 |
| 2006/0042562 A1* | 3/2006 | Wagner | A01K 27/002 |
| | | | 119/792 |
| 2006/0288960 A1* | 12/2006 | Harrison | A01K 27/004 |
| | | | 119/794 |
| 2007/0006823 A1* | 1/2007 | Sandberg | A01K 27/008 |
| | | | 119/856 |
| 2009/0235873 A1* | 9/2009 | Gould | A01K 27/00 |
| | | | 119/770 |
| 2013/0167781 A1 | 7/2013 | Marshall | |
| 2016/0113245 A1 | 4/2016 | Swanger | |
| 2017/0049078 A1* | 2/2017 | Farrar | A01K 27/001 |
| 2017/0280686 A1* | 10/2017 | Cory | A01K 27/001 |
| 2018/0192617 A1 | 7/2018 | Jirsa et al. | |
| 2019/0059333 A1* | 2/2019 | Lagarde | A01K 27/005 |
| 2019/0208748 A1 | 7/2019 | Young | |
| 2020/0359604 A1 | 11/2020 | Soto | |
| 2021/0337769 A1 | 11/2021 | Walters | |
| 2022/0071172 A1 | 3/2022 | DeLuccia et al. | |
| 2022/0079120 A1 | 3/2022 | Brian | |
| 2022/0082123 A1 | 3/2022 | Fiedler et al. | |
| 2022/0125018 A1 | 4/2022 | Farrar et al. | |
| 2022/0142125 A1 | 5/2022 | Betzer | |

FOREIGN PATENT DOCUMENTS

| | | |
|---|---|---|
| WO | 1985001857 A1 | 5/1985 |
| WO | 2021226621 A1 | 11/2021 |

* cited by examiner

APPARATUS THAT ENABLES A LEASH TO COIL AROUND AN ANIMAL'S COLLAR

CROSS-REFERENCE TO RELATED APPLICATIONS

This application is a continuation-in-part of U.S. patent application Ser. No. 17/076,558 filed Oct. 21, 2020, and claims priority of U.S. provisional patent application Ser. No. 63/019,833 filed May 4, 2020, both of which are incorporated by reference herein.

FIELD OF THE INVENTION

The present invention relates generally to apparatus that enable a leash for an animal, primarily domesticated pets, to be stored around the animal's neck when not in use, such as in a position around and outward of the animal's collar, and more specifically to magnetic attachments for a leash that enable the leash to be stored around the animal's neck when not in use.

The present invention also relates generally to leashes for animals that stay around the animal's neck when not in use, and more specifically to animal leashes that use magnetism to enable them to be stored around the animal's neck when not in use.

BACKGROUND OF THE INVENTION

It is common for pet leashes to be misplaced by the pet owner. This issue is eliminated by providing a wearable leash that can be stored in connection with the pet's collar which is almost always worn by the pet. There are several constructions of wearable leashes in the field.

U.S. Pat. No. 887,072 (Delaney) describes a pet collar having a casing and a chain having a handle at one end and secured at its opposite end to a drum inside the casing, and which passes through an aperture in the casing. A coil spring is within the drum. As the chain is pulled outward, the spring is wound up, and as the chain is released, the spring winds up the chain about the drum within the casing. In use, when the leash is secured to a dog's collar and the handle is held, as the dog runs further away from the owner, the leash is paid out and the spring is wound up. As the dog runs nearer the owner, the spring automatically rotates the drum within the casing and winds up the chain or leash, thereby automatically preventing the leash from becoming entangled, and obviating the necessity of winding the leash about the owner's hand to take up slack. If the dog is allowed to run loose, it is unnecessary to remove the leash from the collar for the leash will be automatically wound up within the casing.

U.S. Pat. No. 2,799,245 (Ruggiero) describes a combination recoilable dog leash and collar. The dog leash and collar enable the leash to be wound around and within the collar of the dog. In order to walk the dog, the dog owner bends down and grasps the handle of the lease, pulling it outwardly from the collar of the dog.

U.S. Pat. No. 4,328,767 (Peterson) describes an apparatus including a flat member with two sections or parts, namely, a collar and a leash. The collar is formed by inserting the leash through a buckle device. An outer surface of the collar is covered with VELCRO™ material of one type, while one surface of the leash has VELCRO™ material of the opposite type so that a gripping effect is achieved when the leash is wound over the collar.

U.S. Pat. No. 4,584,967 (Taplin) describes a collar/leash combination for pets that includes a flexible flat member having outer and inner surfaces, a buckle on one end having a frame and a locking pin that pivots on the frame and is insertable through the flexible member so that a collar may be formed by passing the other end of the member through the buckle. The flexible member is kept in place using VELCRO™ material of one type on the outer surface's section of the member that is formed into a collar and the rest of the outer surface has the opposite type of VELCRO™ material. The inner surface of the member has VELCRO™ material of the same type used on the outer surface's collar section.

U.S. Pat. No. 6,499,437 (Sorenson et al.) describes a leash with a magnetic connector that includes first and second connector parts, each having a respective magnet. The magnetic connector automatically aligns the two parts with respect to one another when the two parts of the connector are brought closely together and automatically interlocks the two parts of the connectors when tension is applied. Tension on the leash automatically moves the first connector part to a second position, and thereby automatically interlocks the first and second connector parts.

U.S. Pat. No. 7,150,247 (Eulette et al.) describes a wearable retracting animal leash designed to attach to the collar of a pet and be permanently worn in this manner. The leash includes a handle that fits neatly against the case when the leash is in a retracted condition. The leash includes a case, an attachment mechanism affixed to the case and which attaches the leash system to a pet collar, a grip handle on an exterior portion of the case, a leash attached to the grip handle, a leash spool having the leash coiled about it in a retracted state and having a spool spindle about which it rotates, and a thin coil spring that is not fixed on one end and is free to rotate, and affixed on another end to the leash spool. The spring provides a rotational bias to the leash spool in a leash retraction direction. A stop mechanism permits the leash to be extended, but prevents the leash from retracting based on the bias of the spring. A stop release mechanism disengages the stop mechanism and permits the lease to be retracted.

U.S. Pat. No. 7,281,495 (Wagner) describes a leash that is an extension of the collar material. A handle loop is attached to the end of the leash opposite the collar. The collar has a fastener adjacent the buckle on the opposite side of the buckle from the point of attachment of the leash. The leash has one fastener adjacent to the attachment point of the leash to the collar on the outside surface of the leash, and another on the inside surface of the leash positioned about halfway along the combined length of the leash and handle. The handle has a fastener on the outside surface adjacent its tip end. When not in use, the leash is wrapped about the collar to allow the inside surface leash fastener to engage the collar fastener. The leash is then folded and wrapped about the collar in the opposite direction to allow the outside surface leash fastener to engage the handle fastener.

U.S. Pat. No. 7,389,750 (Rogers et al.) describes a leash and collar system having a coupling that can allegedly be quickly attached and detached with one hand even while the coupling is pulled in tension. The coupling has male and female sections that selectively interconnect. A magnet is arranged within the receptacle at a base of the receptacle. The male section has an internal plunger that selectively moves between a forward position and a rearward position. Locking elements protrude from the male section when the internal plunger element is in the forward position. The locking elements prevent the male section from being retracted out of the receptacle.

U.S. Pat. No. 7,461,615 (Albright) describes a harness with a retractable leash secured on the harness so that it remains in a fixed location on the animal's back, even when the leash is not in use, making it comfortable for the animal, yet accessible for the user. The harness has a housing mounted thereto with a retractable leash system enclosed within the housing. The housing for the retractable leash system is mounted to the harness and holds a coiled spring with a leash surrounding a spool. A saddle portion allows permanent attachment of the housing and leash assembly to the harness. The leash length is adjustable as desired by the user by way of the coiled spring and spool.

U.S. Pat. No. 9,549,536 (Soto) describes a collar with a first magnetic member and a leash suitable for coupling with the magnetic member of the collar. The leash includes a hollow tubular member and a spool positioned at a first end of the hollow tubular member. The spool is wound with a leash line and a release line, the leash line and release line extending through the hollow tubular member. A magnetic attachment assembly is affixed to both the lease line and release line. The magnetic attachment assembly is suitable for releasably receiving the collar magnetic member.

U.S. Pat. No. 9,599,145 (Durfee) describes a magnetic clasp animal leash assembly for connecting to an animal collar having at least one metallic leash attachment ring defining an aperture. The assembly has two members movable with respect to one another between a closed position and an open position. The members have an internal surface creating an aperture in a closed state. Outer ends of the members are spaced from one another creating a passage with respect to the internal surface defining the aperture in an opened state. A magnet is located opposite from the clear passage proximate to the internal surface of the aperture. An actuator assembly is engageable with the members to drive the members toward the open position.

U.S. Pat. Nos. 9,961,882 and 10,231,439 (Woods) describe a leash that is always on the collar, and can be used on nearly any collar. The leash includes a top housing, a bottom housing, and a separate retainer. The top housing has protrusions on opposing sides while the retainer has openings on opposite sides that engage the protrusions in the top housing to enable the bottom housing to be secured between the top housing and retainer. The housing has a coiled power spring secured at a first end with a spool being secured to a second end. The spool has a first end of a lanyard secured therein while a second end of the lanyard is secured to a handle outside of the housing. The lanyard passes through a lanyard retainer. The collar is slidably securable within a gap between the retainer and bottom housing. An alleged advantage of this leash is that the leash can be removed and placed on a different collar when the animal grows and when the collar wears out or is damaged.

U.S. Pat. Appln. Publ. No. 20190059333 (Lagarde) describes a magnetic collar and combination leash apparatus including a fastener member at a first end of a belt member with the leash portion being at a second end of the belt member. The second end is threaded through the fastener member so that the leash portion is double-backed to overlie the belt member. The leash portion is coupled to the belt member proximal the first end by two magnets. Force applied to the belt member is said to be borne by the ring member until the leash portion is grasped manually and pulled away from the belt member, whereby the leash portion is deployed.

U.S. Pat. Appln. Publ. No. 20190208748 (Young) describes a retractable pet leash including a collar assembly, a flexible loop-shaped handle member having a connector located on an inner surface to allow the handle to be securely closed for folding, and a first hub assembly in a forward end of the handle member and having a biased member connected to a first end of a leash. An opening in the forward end of the handle member allows the leash line to extend therethrough in response to extension and retraction of the leash line from the first hub assembly. A second hub assembly is located on the collar assembly and includes a biased member connected to a second end of a leash. A leash connector couples the leash to the first hub assembly and the second hub assembly. The connector may include a magnet.

WO1985001857A1 (Sleight) describes a combined animal collar and leash of longitudinal strip webbing material. The collar and the leash have VELCRO™ connecting means that releasably connect the leash upon the collar to store the leash upon the collar when not in use. The leash has a handle at one end.

None of these prior art leashes is believed to be configured for use with a potentially conventional collar that is worn around the pet's neck and can be coiled or wound around the collar when not in use using magnetism.

OBJECTS AND SUMMARY OF THE INVENTION

It is an object of at least one embodiment of the invention to provide apparatus that enable a leash for an animal to be stored around the animal's neck when not in use, such as in a position around and outward of the animal's collar.

It is another object of at least one embodiment of the invention to provide magnetic attachments for a leash that enable the leash to be stored around the animal's neck when not in use.

It is another object of at least one embodiment of the invention to provide a new and improved leash for an animal, usually a person's pet that they walk, which can be retained around the animal's neck when not in use and/or which can be expanded to a use state from a non-use state wound or coiled around the animal's neck.

It is still another object of at least one embodiment of the invention to provide a new and improved leash for an animal that uses magnetism to enable the leash to be retained in a wound or coiled state around the animal's neck when not in use.

In order to achieve one or more of these objects or other objects, an apparatus in accordance with the invention to enable an elongate leash, which typically includes a clip at one end region attachable to a collar on the animal, to coil around the animal's neck when not in use includes a plurality of retainers each including a polarized magnet and first and second parts that have an at least partly separated state that enables placement of the leash between the first and second parts at any one of a plurality of different, user-selectable locations along a length of the leash and an engaged state in which the first and second parts are fixed to the leash at a user-selected location along the length of the leash. The retainers are configured, with respect to the polarity of the magnets therein, to enable them to magnetically couple to one another and provide the leash with a coiled state around the animal's neck.

To provide the at least partly separated and engaged states, the first part includes first engagement means and the second part includes second engagement means that selectively cooperate with the first engagement means to provide the first and second parts with the partly or fully separated state and the engaged state. The first and second engagement means can be configured to snap into one another when transitioning from the separated state to the engaged state, and snap apart when transitioning from the engaged state to the at least partly separated state. The first part may be generally C-shaped and include a back portion and two flanges that each have a side surface facing the side surface of the opposite flange across a gap. The second part may include a housing that retains the magnet, e.g., in a cavity on its underside, and the second engagement means are on this housing.

As an example of one configuration of engagement means, which is currently considered a preferred configuration, the first engagement means include a longitudinal channel in each flange that extends between side walls of a housing of the first part and transverse channels that extend from the gap into each longitudinal channel. The second engagement means include a pair of projections that extend from each of two side walls of the housing of the second part on opposite sides of the housing, an elongate rod extending between the projections on each side of the housing and an intermediate support projection in a middle region between the projections on each side of the housing. The projections, elongate rod and intermediate support projection are configured, e.g., dimensioned and positioned, to mate with and be situated in the longitudinal and transverse channels.

A leash including the foregoing apparatus may have four retainers, one positioned by the user adjacent the clip, one positioned by the user adjacent an opposite end region of the leash and two more positioned by the user between the end region retainers. The four retainers are configured to enable two magnets (including one at one end region) to magnetically couple to one another and two other magnets (including one at the other end region) to magnetically couple to one another and provide the leash with a coiled state around the animal's neck.

A wearable magnet-containing leash in accordance with the invention wraps around the neck of a domesticated pet or other animal, e.g., a dog, when not in use. The leash connects to an ordinary and conventional collar on the dog just like other conventional leashes, for example, with a metal P-lock. However, instead of disconnecting the leash from the collar after the person walks the dog, the person is able to wrap the leash around the dog's neck and it connects to itself via magnets to provide a coiled or wound state. By being retained on the dog's neck, the leash is always accessible and can be pulled right off the dog's neck once it is needed again. The presence of the magnets on the leash is not believed to adversely affect the dog.

Another way to consider the invention is as an animal leash that includes an elongate member having a first end region and a second end region at an opposite end of the member from the first end region, a clip arranged at the first end region of the member and configured to attached to a collar on the animal, and a magnetic coupling arrangement that provides at least two magnetic couplings along the length of the member to provide the member with a coiled state in which the magnetic couplings are present (forming a magnetic bond) and an extended state in which the magnetic couplings are not present (do not form a magnetic bond). The magnetic coupling arrangement includes a first magnet at a first end region of the member and a second magnet at a second end region at an opposite end of the member from the first end region, which first and second magnets may be either fixed to the member or in movable retainers. Third and fourth magnets are in retainers movable longitudinally along the member between the first and second end regions. By user-selection of the location of the retainers for the third and fourth magnets along the length of the member, the third magnet is configured to magnetically couple to the first magnet when the member is in the coiled state and the fourth magnet is configured to magnetically couple to the second magnet when the member is in the coiled state.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figures 1, 1A:
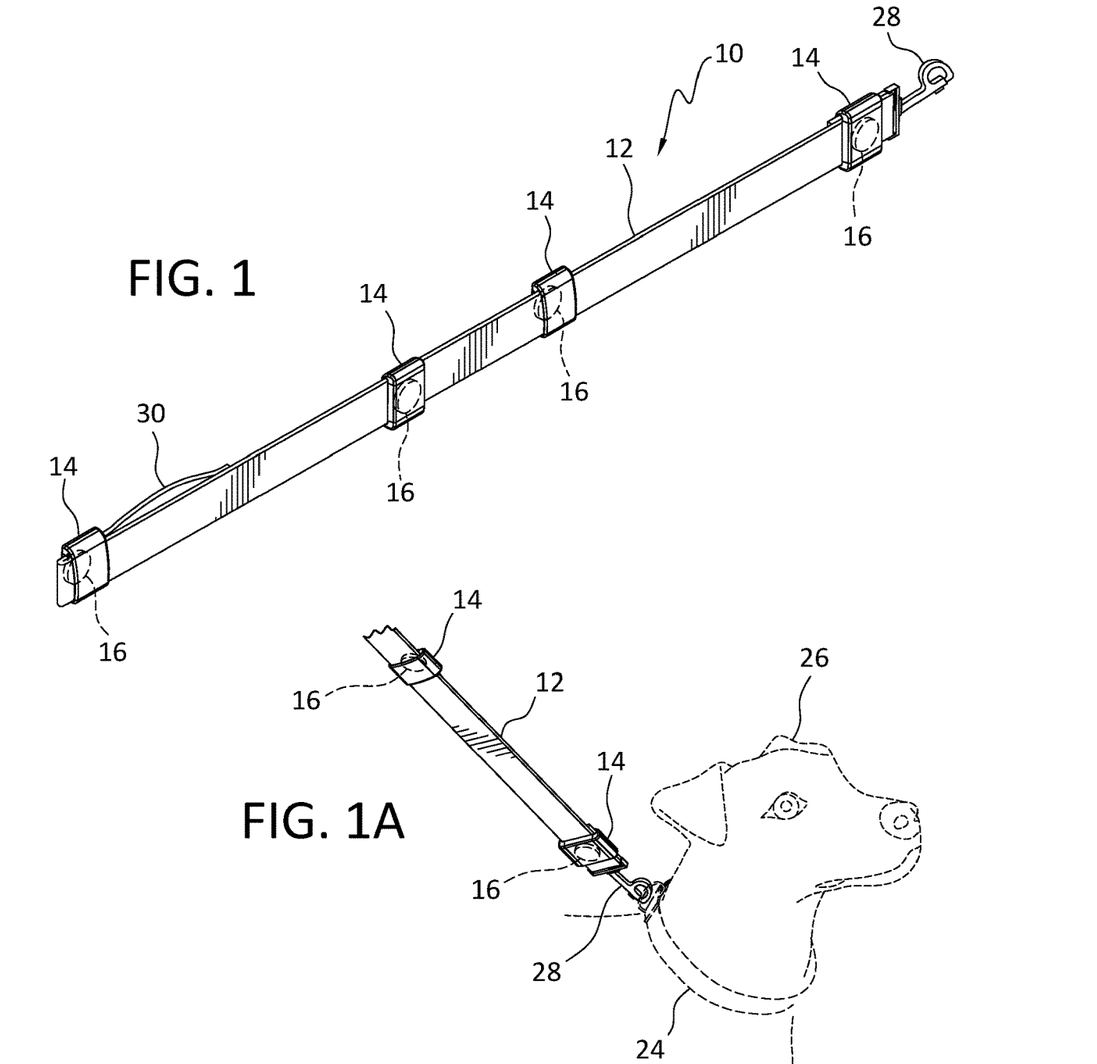
FIG. 1 is a perspective view of an apparatus in accordance with the invention shown with a leash.
FIG. 1A is a view showing use of the leash.
Figure 2:
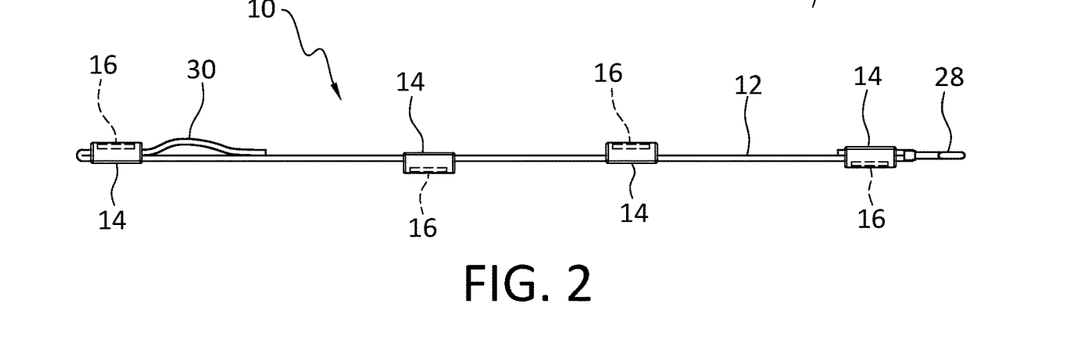
FIG. 2 is a side view of the apparatus shown in FIG. 1 with a leash.
Figure 3:
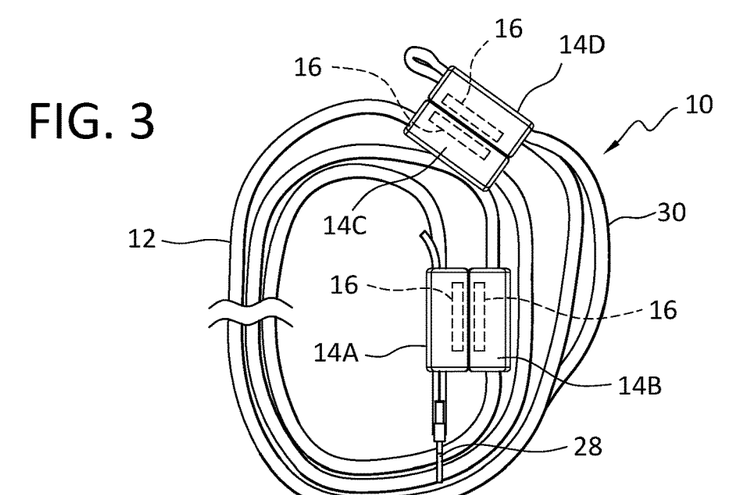
FIG. 3 is a view showing the apparatus with the leash in a coiled state.

Referring to the accompanying drawings wherein the same reference numbers refer to the same or similar elements, FIGS. 1-3 show a first embodiment of an apparatus 10 to enable an elongate leash 12 to coil around an animal's neck when not in use, and also around and connected to the animal's collar. The apparatus 10 in accordance with the invention includes four magnet retainers 14 situated at different, user-selectable locations along the longitudinal extension or length of the leash 12 and that are or can be secured to the leash 12 in a fixed position at least temporary (in time).

Each retainer 14 includes, in addition to a magnet 16, first and second parts 18, 20 that have an at least partly separated state that enables placement of the leash 12 between the first and second parts 18, 20 at any one of a plurality of different, user-selectable locations along the length of the leash 12 and an engaged state in which the first and second parts 18, 20 are fixed to the leash 12 at a user-selected location along the length of the leash 12. The retainers 14 are configured with respect to the polarity of the magnets 16 therein to enable them to magnetically couple to one another and provide the leash 12 with a coiled state around the animal's neck (FIG. 3). This may be achieved by appropriate selection of the retainers 14 to use with leash 12 since some retainers 14 have a magnet 16 polarized with the North pole at the top and others have the reverse polarity, i.e., a magnet 16 polarized with the South pole at the top. FIG. 2 shows the retainers 14 in opposite orientations on the leash 10 to enable the magnetic couplings. Multiple magnets may be provided in each retainer 14. The user-selectable locations should include each end region of the leash 12 to provide for an optimally coilable leash.

First and second parts 18, 20 define a channel 22 when in the engaged state in which the leash 12 is situated. When attached to the leash 12, the material of the leash 12 is retained in the channel 22 with movement of the leash 12 relative to the retainers 14 being prevented. The first part 18 may be considered a cover member while the second part 20 may be considered a base member since it serves as base for the magnet 16. The first and second parts 18, 20 are, in the illustrated embodiment, completely separated from one another when in the separated state, but they can be only partly separated from one another in the separated state, i.e., separated sufficiently to enable positioning of the retainer 14 around the leash 12 so that the leash 12 is insertable into the channel 22.

Leash 12 is designed to attach to a collar 24 of an animal, for example a dog 26, and to this end includes a P-lock 28 at one end (FIGS. 1 and 1A). The P-lock 28 is an example of an attachment mechanism or attachment means that connect the leash 12 to the collar 24 and other attachment structure comparable or equivalent to a P-lock 28 may be used in the invention. One skilled in the art would realize what other structure is comparable and equivalent to a P-lock 28. Attachment means as used herein to attach the leash 12 to the collar 24 therefore encompasses a P-lock and any and all other comparable and equivalent structure known to those skilled in the art to which this invention pertains. The attachment means typically provide an easy and manual attachable and detachable, yet secure, connection of the leash 12 to the collar 24.

The leash 12 includes an elongate member typically made of any material from which a leash is made, e.g., fabric, and will typically form a loop 30 at one end through which the user inserts their hand to grasp the leash 12 when attached to an animal, e.g., their pet dog 26, and enable them to walk their dog 26 when the leash 12 is in an extended, use state (FIG. 1A). Such a loop 30 is not required in the invention.

Figures 4, 5, 6:
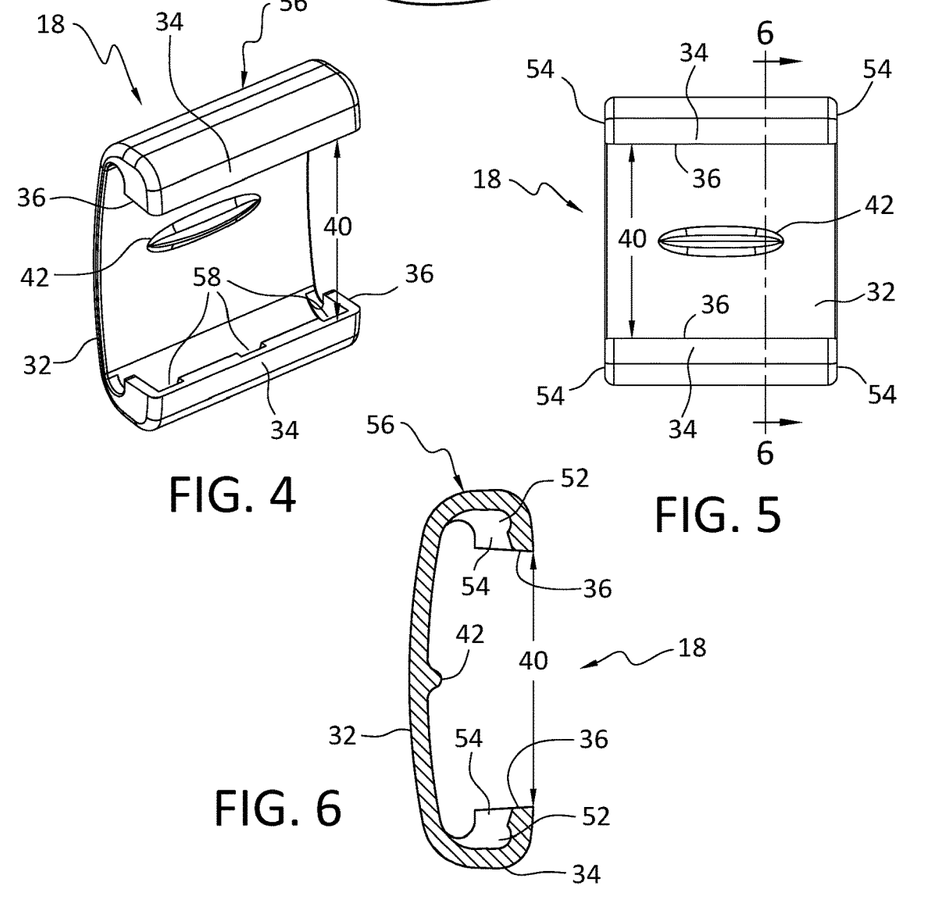
FIG. 4 is a perspective view of a first, cover part of the magnet retainer.
FIG. 5 is a top view of the first, cover part shown in FIG. 4.
FIG. 6 is a cross-sectional view of the first, cover part shown in FIG. 4 taken along the line 6-6 in FIG. 5.

An exemplifying, non-limiting embodiment of the first part 18 has a C-shape with a back portion 32, two flanges 34 that each have a side surface 36 facing the side surface 36 of the opposite flange 34 across a gap 40, and an optional protuberance 42 on the inside surface of the back portion 32 (FIGS. 4-6). The protuberance 42 aids in retention of the leash 12 in the channel 22.

The second part 20 includes a housing 44 that retains the magnet 16, and as an example, defines a cavity 46 on its underside that receives the magnet 16 (FIGS. 7-10). As shown, the cavity 46 is cylindrical and the magnet 16 is also cylindrical. This geometric form does not limit the invention in any manner whatsoever and different shapes of the cavity 46 and magnet 16 are within the scope of the invention. Second part 20 may be formed by insert-molding plastic around the magnet 16 to provide an insert-molded magnet captured by plastic. In this case, it is possible to insert mold a magnetizable material and magnetize the material after injection molding. The upper side of the second part 20 may have a planar or flat portion 50 provided with a logo and/or textured. The dimensions of the first and second parts 18, 20 can vary to accommodate different sizes of the leash 12.

The first and second parts 18, 20 include respective first and second engagement means that selectively cooperate with one another to provide the separated or engaged state. In the illustrated embodiment, the first and second engagement means snap into one another when transitioning from the separated state to the engaged state, and snap out of engagement when transitioning from the engaged state to the separated state, but other types of engagement are possible. The structure that provides this snap may be small hooks or grooves in the first part 18 (the back piece) that hook onto the housing 44 of the second part 20 using a cylindrical-shape bar. Numerous different types, constructions and configurations of engagement means are within the scope of the invention. The first and second engagement means should be considered any structure formed on two parts that cooperates when in a first condition to connect or engage the two parts and that also has a second condition in which the two parts are at least partly separated from one another to enable insertion of a leash or the elongate member thereof into a channel defined by one or both of the parts. These parts may be separate members that can be completely separated from one another, or different parts of a common member.

The first engagement means may be situated in connection with the flanges 34 of the first part 18 and side walls 48 of the housing 44 of the second part 20 that are on opposite sides of the housing 44.

Figure 7:
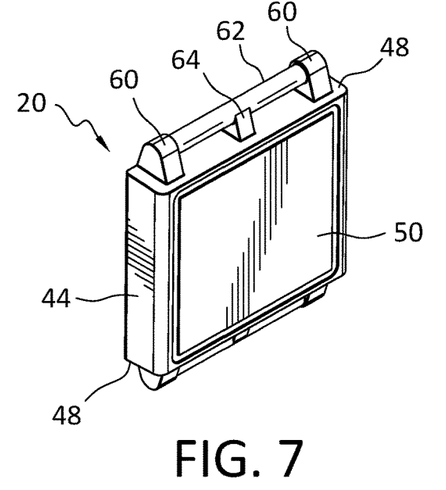
FIG. 7 is a top perspective view of a second, base part of the magnet retainer.
Figure 8:
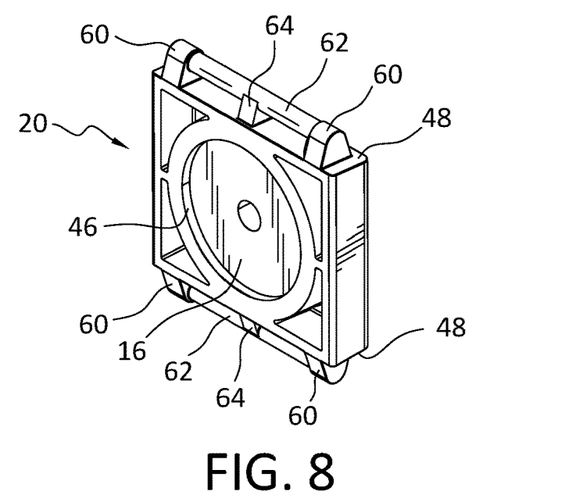
FIG. 8 is a bottom perspective view of the second, base part shown in FIG. 7.
Figures 9, 10, 11:
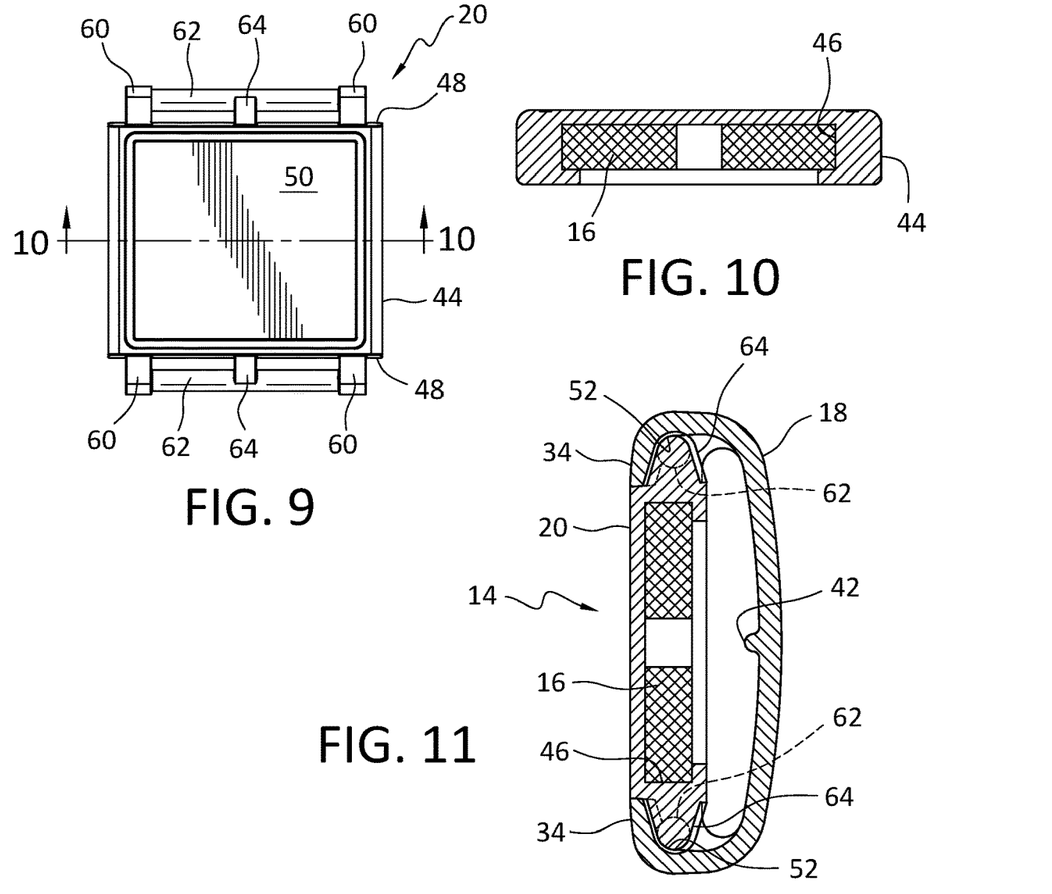
FIG. 9 is a top view of the second, base part shown in FIG. 7.
FIG. 10 is a cross-sectional view of the second, base part shown in FIG. 7 taken along the line 10-10 in FIG. 9.
FIG. 11 is a cross-sectional view showing the engagement of the first, cover part of FIG. 4 and the second, base part of FIG. 7.

As a non-limiting example, the first engagement means may include a longitudinal channel 52 in each of the two flanges 34 that extends between side walls 54 of a housing 56 of the first part 18 and three transverse channels 58 that extend from the gap 40 into each longitudinal channel 52 (FIG. 4). This combination constitutes a channeled formation on the underside of each flange 34, and the channels 52, 58 generally form hooks or grooves receivable of structure of the second part 20, identified below. The second engagement means include a pair of projections 60 that extend outward from each of the two side walls 48 of the housing 44 of the second part 20, an elongate bar or rod 62 extending between the projections 60 on each side of the housing 44 and an intermediate support projection 64 in a middle region between the projections 60 on each side of the housing 44 and that is connected to and provides support to the rod 62 (FIG. 7). The rod 62 has a generally cylindrical cross-section (FIGS. 7-9). This combination constitutes a supported rod construction on opposite edges or sides of the second part 20 that is complementary to the channeled formation.

Engagement of the first and second parts 18, 20 entails positioning the first and second parts 18, 20 so that the supported rod constructions of the second part 20 are within the interior space defined by the first part 18 and then snapping the supported rod constructions into the respective channeled formation on the aligning flange 34 by pushing the supported rod constructions upward and outward in a direction away from the back portion 32. It should be possible to position both supported rod constructions within the interior space defined by the first part 18, since the material of the leash 12 or the elongate member thereof will typically be pliable and the second part 20 can thus be pressed into the leash 12.

Alternatively, it is possible to position only one supported rod construction within the interior space defined by the first part 18, push it upward and outward in a direction away from the back portion 32 to engage one side of the second part 20, and then press the second part 20 to force the as yet un-engaged supported rod construction on the other side into the respective channeled construction to thereby provide for complete engagement of the first and second parts 18, 20 using both supported rod constructions and channeled formations. This engagement cannot be easily disengaged and provides a secure attachment or engagement of the first and second parts 18, 20. When engaged, the channel 22 is formed between the underside of the second part 20 and the upperside of the first part 18 into which the leash 12 is positioned, e.g., typically before the first and second parts 18, 20 are engaged with one another (FIG. 11).

For use, the user attaches four retainers 14, designated 14A, 14B, 14C and 14D in FIG. 3, to the leash 12 at user-selectable locations which preferably include one at each end region. The other two are positioned between the end regions. For a walk, the user attaches the P-lock 28 to the dog's collar 24, and walks the dog 26 in the usual manner. When the walk is over and the user wants to store the leash 12, the user, while preferably keeping the dog 26 in a stationary position, coils or winds the leash 12 around the dog's neck to bring the second retainer 14B into at least partial contact with the first retainer 14A, which contact is maintained by magnetic force between the magnets 16 in retainers 14A and 14B (FIG. 3). A portion of the leash 12 between the first and second retainers 14A, 14B will thus be wound about the dog's neck and collar 24. The user continues this winding motion of the leash 12 around the dog's neck until the third retainer 14C is around the dog's neck and further continues the winding motion until the fourth retainer 14D is in at least partial contact with the third retainer 14C, and which contact is maintained by magnetic force between the magnets 16 in retainers 14C and 14D (FIG. 3). The leash 12 is thus now completely wound around the dog's neck with two magnetic couplings, i.e., between the magnets 16 of the first and second retainers 14A, 14B and between the magnets of the third and fourth retainers 14C, 14D. These two magnetic couplings keep the leash 12 in a coiled state (FIG. 3).

Orientation and configuration of the magnets 16 in retainers 14A, 14B, 14C, 14D is important to enable the magnetic couplings between magnets 16 in retainers 14A and 14B and between magnets 16 in retainers 14C and 14D when the leash 12 is in its coiled, non-use state. To this end, retainers 14A, 14B, 14C, 14D are placed at the user-selectable locations on the leash 12 to ensure a North pole/South pole contact when the leash 12 is in the coiled state. This is achieved very easily for two reasons, namely, the retainers 14A, 14B, 14C, 14D can be removably attached to the leash 12 with either side facing up and because the retainers 14A, 14B, 14C, 14D are formed with some having their magnet's North pole up and others having their magnet's South pole up (FIGS. 2 and 3). One skilled in the art would readily understand from the disclosure herein how to orient the retainers 14A, 14B, 14C, 14D to ensure magnetic coupling between the magnets 16 therein and position them to obtain a coiled leash 12.

A method for using apparatus 10 entails obtaining a number of retainers 14 which may be based on the length of the leash 12 and the size of the collar or neck of the animal to be leashed. A kit including a set number of retainers 14 for specific leash sizes may be produced and sold. The user selects the position of the retainers 14 on the leash 12 and places the leash 12 in the interior of the first part 18 of each retainer 14 through the gap 40 to a position against the back portion 32 and the protuberance 42 thereon. The user then snaps the second part 20 into each respective first part 18 by placing the rods 62 against the leash 12 and then pressing the second part 20 forward engaging the rods 62 into the channels 52, 58 to snap them into place. The retainers 14 are ideally placed one close to the connection of the leash 12 to the collar and one at the opposite end of the leash 12, and any remaining retainer(s) therebetween in a position to ensure retention of the coiled leash around the animal's collar and neck. The user can adjust the position of the retainers 14 if, when they try to coil the leash 12 around the animal's neck, the retainers 14 do not align with one another. Repositioning the retainers 14, as well as removal of the retainers 14 from the leash 12, involves holding the retainer 14 sought to be moved by the first part 18, pushing the second part 20 thereof inward against the leash 12 and relative to the first part 18 to separate the second part 20 from the first part 18. The first part 18 is then moved along the leash 12 to a new position and then the second part 20 is re-engaged with the first part 18.

Figure 12:
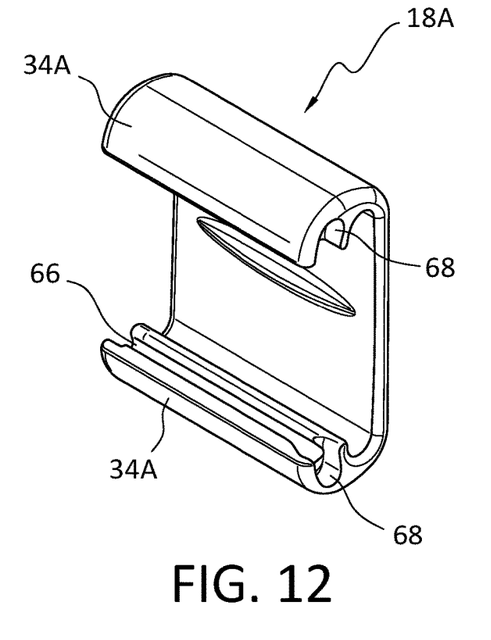
FIG. 12 is a perspective view of another embodiment of a first, cover part of the magnet retainer.
Figure 13:
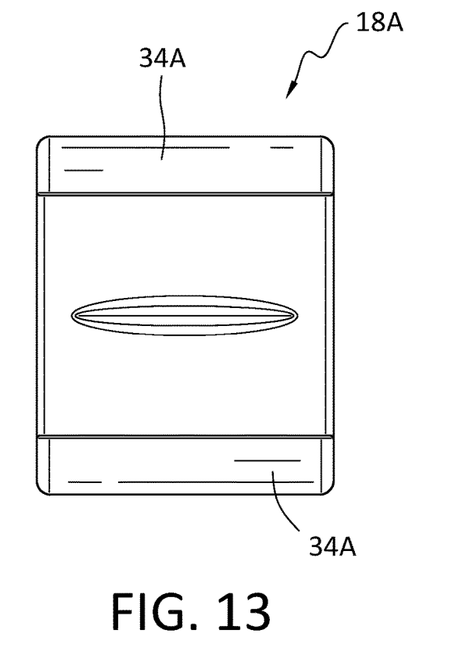
FIG. 13 is a top view of the first, cover part shown in FIG. 12.
Figure 14:
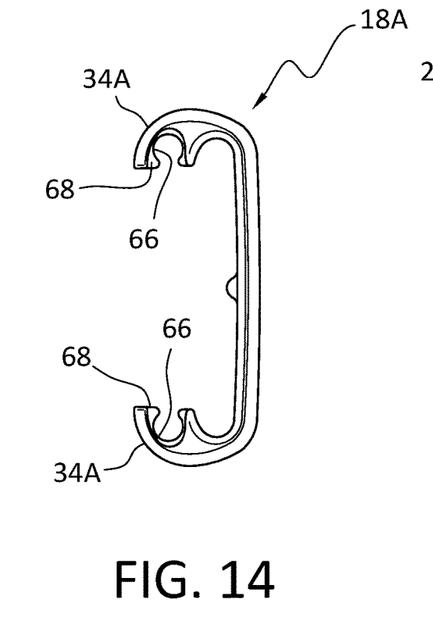
FIG. 14 is a cross-sectional view of the first, cover part shown in FIG. 12 taken along the line 14-14 in FIG. 13.
Figure 15:
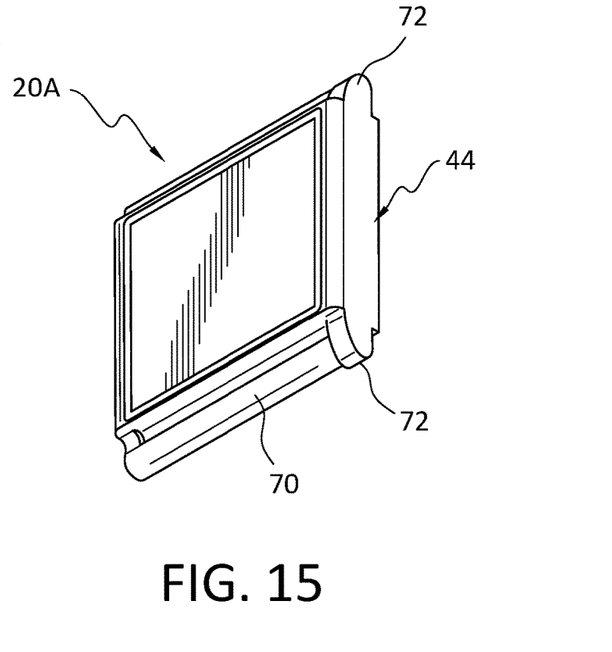
FIG. 15 is a top perspective view of another embodiment of a second, base part of the magnet retainer.
Figures 16, 17, 18:
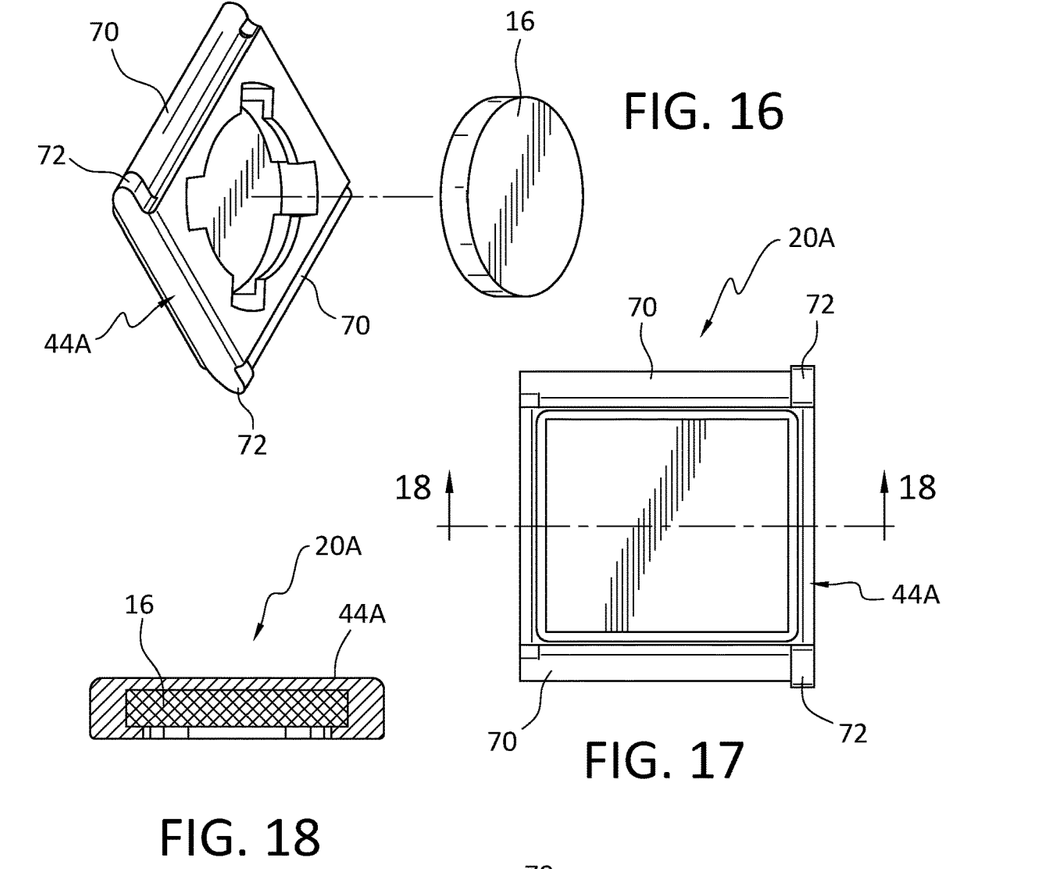
FIG. 16 is a bottom exploded, perspective view of the second, base part shown in FIG. 15.
FIG. 17 is a top view of the second, base part shown in FIG. 16.
FIG. 18 is a cross-sectional view of the second, base part shown in FIG. 16 taken along the line 18-18 in FIG. 17.

Alternative engagement means are a dovetail-type engagement which enables the first and second parts, designated 18A, 20A in FIGS. 12-19, to be slid one into the other to form retainer 14E. The first engagement means on the first part 18A include a longitudinally extending channel 66 with an expanded gap or enlarged portion 68 at one end in each flange 34A (FIGS. 12-14). The channel 66 preferably tapers toward the enlarged portion 68. The second engagement means on the second part 20A include a contoured projection 70 on or as each side wall of the housing 44A on opposite sides thereof (FIGS. 15-17). Each contoured projection 70 includes an small knob or enlarged region 72 at one end (the same end on each projection 70).

Figure 19:
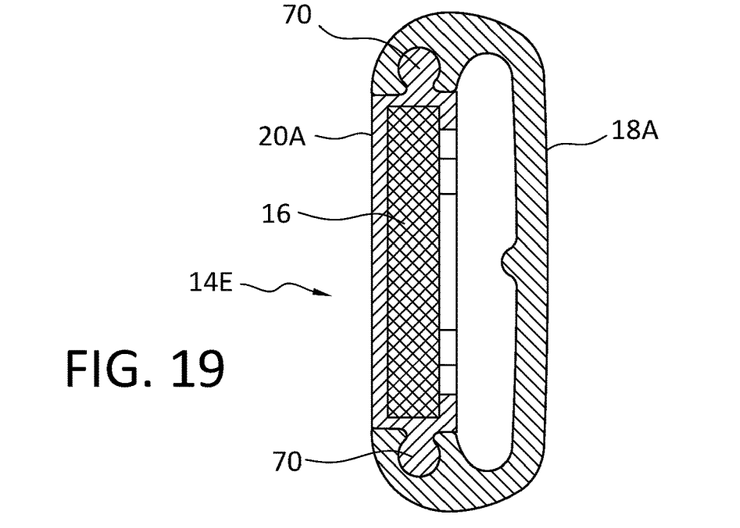
FIG. 19 is a cross-sectional view showing the engagement of the first, cover part of FIG. 12 and the second, base part of FIG. 15.

Engagement of the first and second parts 18A, 20A entails positioning the first and second parts 18A, 20A so that an end of the contoured projections 70, at the end without the enlarged region 72, each align with the opening of a respective one of the channels 66 of the flanges 34A on that side with the enlarged portion 68. From this relative positioning, the contoured projections 70 are then slid into the channels 66 until the enlarged regions 72 at the ends of the contoured projections 70 enter into the enlarged portions 68 at the ends of the channels 66 and click in (FIG. 19). Retention of the contoured projections 70 in the channels 66 is provided by suitable formation of the contoured projections 70 and channels 66 relative to one another, as would be understood by those skilled in the art in view of the disclosure herein.

Dimensions of the channels 66 and enlarged portions 68 thereof and the contoured projections 70 and enlarged regions 72 thereof are determined to preferably provide a snap-in type engagement. This engagement cannot be easily disengaged and provides a secure attachment of the first and second parts 18A, 20A. When engaged, the channel 22 is formed between the underside of the second part 20A and the upperside of the first part 18A into which the leash 12 is positioned, e.g., typically before the first and second parts 18A, 20A are engaged with one another.

A method for using apparatus 10 with retainers 14E entails obtaining number of retainers 14E which may be based on the length of the leash 12 and the size of the collar or neck of the animal to be leashed. A kit including a set number of retainers 14E for specific leash sizes may be produced and sold. The user selects the position of the retainers 14E on the leash 12 and places the leash 12 in the interior of the first part 18A of each retainer 14E through the gap between flanges 34A to a position against the back portion 32 and the protuberance 42 thereon. The user then slides the second part 20 into each respective first part 18 by aligning the projections 70 with the channels 66 and then sliding the projections 70 into the channels 66 until further movement is not possible, i.e., when the enlarged portions 68 click into the enlarged regions 72. The retainers 14E are ideally placed one close to the connection of the leash 12 to the collar and one at the opposite end of the leash 12, and any remaining retainer(s) therebetween in a position to ensure retention of the coiled leash around the animal's collar and neck. The user can adjust the position of the retainers 14E if, when they try to coil the leash 12 around the animal's neck, the retainers 14E do not align with one another. Repositioning the retainers 14E, as well as removal of the retainers 14E from the leash 12, involves holding the retainer 14E sought to be moved by the first part 18A, pushing the second part 20A thereof outward from the side having the enlarged portions 68 and corresponding enlarged regions 72 relative to the first part 18A to separate the second part 20A from the first part 18A. The first part 18A is then moved along the leash 12 to a new position and then the second part 20A is re-engaged with the first part 18A.

Figures 20, 21, 22, 23:
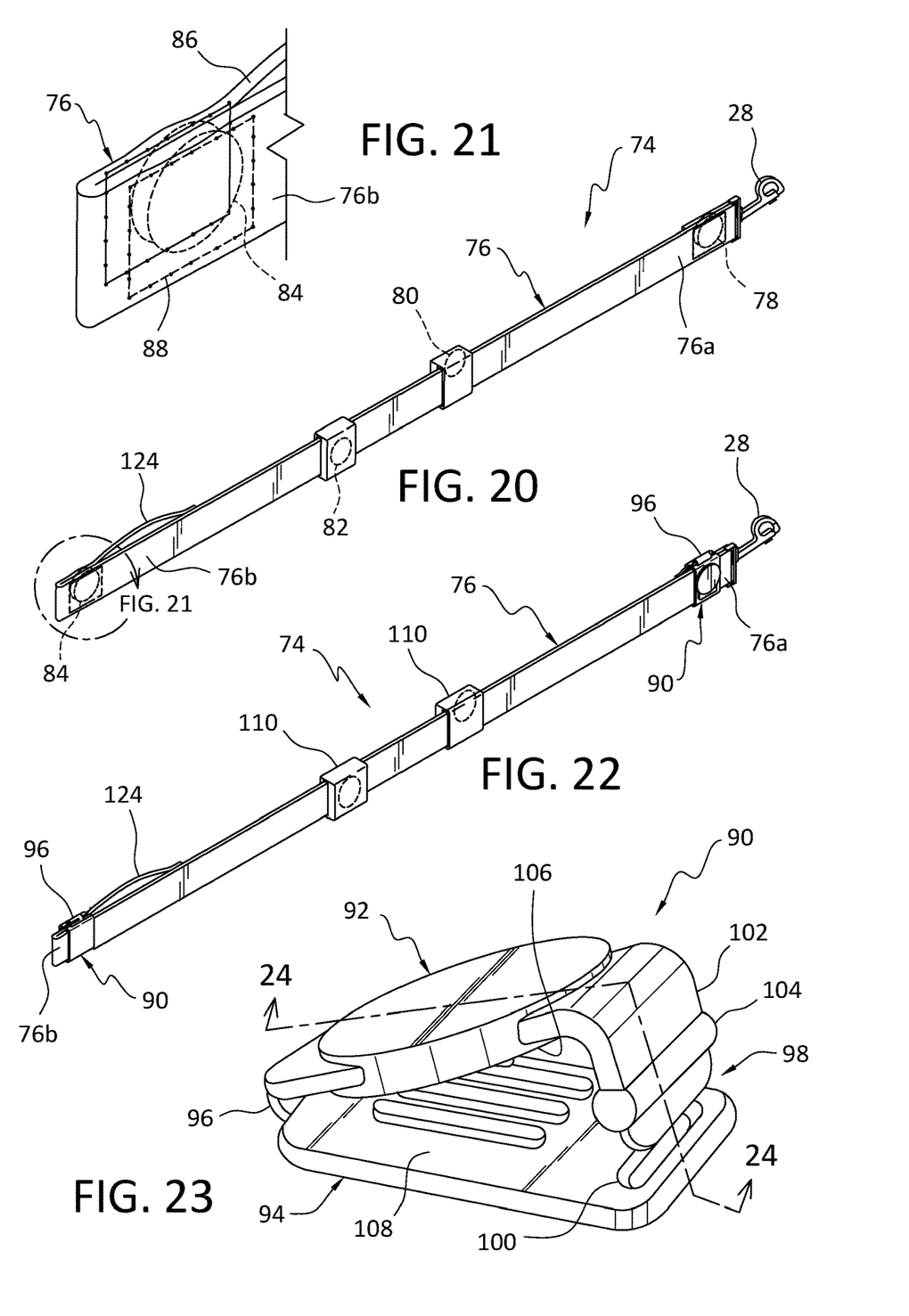
FIG. 20 is a perspective of a first embodiment of a leash in accordance with the invention.
FIG. 21 is an enlarged view of the area designated 21 in FIG. 20.
FIG. 22 is a perspective view of a second embodiment of a leash in accordance with the invention.
FIG. 23 is a perspective view of a fixed magnet retainer of the leash in accordance with the invention.

FIG. 20 shows another embodiment of an inventive leash 74 which includes an elongate member 76 and four magnets 78, 80, 82, 84 situated at different locations along the longitudinal extension or length of the member 76. The member 76 may be made of any material from which a leash is made, e.g., fabric, and will typically form a loop 124 at one end through which the user inserts their hand to grasp the leash 74 when attached to their pet dog, and enable them to walk their dog when the leash 74 is in an extended, use state.

Magnets 78, 84 are stationary on the member 76 one at each end or end region 76a, 76b. Magnet 78 is situated just after and preferably adjacent to the P-lock 28. Magnets 78, 84 are oriented relative to the member 76 with a specific polarity discussed below. To achieve their stationary positioning, the magnets 78, 84 are fixed to the member 76 or secured in a retainer that is fixed to or secured to the member 76.

Magnets 78, 84 may be fixed to the member 76 by sewing fabric in a pattern, e.g., each magnet 78, 84 is surrounded by fabric 86 of the member 76 and then sealed in a space formed by the fabric 86 by stitches 88 (FIG. 21). Other means for fixing the magnets 78, 84 to the member 76 may be used, with this fixing being a permanent placement in the member 76. Permanent in this context means that the magnets 78, 84 cannot be removed without damaging or destroying the member 76.

Instead of permanently fixing the magnets 78, 84 in connection with the member 76, each magnet 78, 84 may be retained in or by a respective retainer 90 which is secured to the member 76 in a fixed position, at least temporarily (FIG. 22). Each retainer 90 includes a first part 92 in which the respective magnet 78 or 84 is situated, a second part 94 spaced apart from the first part 92 by connected thereto by a hinge 96 along an edge of the first and second parts 92, 94, and a latching mechanism 98 on an opposite side of the first and second parts 92, 94 from the hinge 96 (FIGS. 23-25).

Latching mechanism 98 includes a slot 100 on the first part 92 and a projection 102 on the second part 94. The projection 102 has a bulge 104 around its circumference that is configured relative to the slot 100 to enable the projection 102 to be urged through the slot 100 so that the bulge 104 is below the slot 100 and retains the projection 102 in connection with the slot 100 and thus the second part 94 in connection with the first part 92. Each retainer 90 can thus assume a latched position in which the projection 102 is engaged with the slot 100 and in which the member 76 is situated in a slot between the first and second parts 92, 94 and pressed between inner facing surfaces 106, 108 of the first and second parts 92, 94, respectively (FIG. 25), to thereby secure the retainer 90 to the member 76. The slot 100 is dimensioned accordingly to be able to accommodate the cross-sectional shape and size of the member 76.

Figure 24:
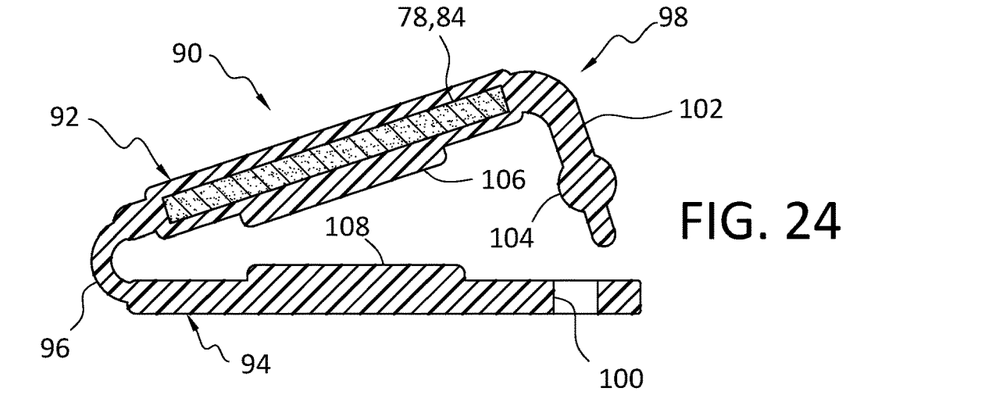
FIG. 24 is a cross-sectional view taken along the line 24-24 of FIG. 23.
Figure 25:
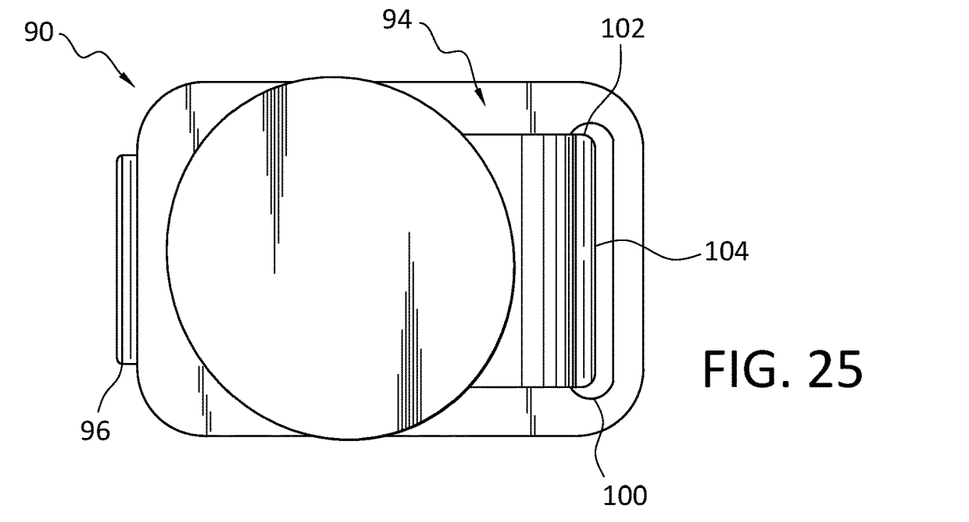
FIG. 25 is a top view of the magnet retainer of FIG. 23.

When not in the latched position, each retainer 90 has an open position in which the retainer 90 is separable from the member 76 and the projection 102 is separated from the slot 100 (FIG. 24). In this state, it is possible to insert the member 76 into the slot defined between the first and second parts 92, 94 and also adjust the position of the retainer 90 relative to the member 76, e.g., to be in or at the first or second end regions 76a, 76b.

Figure 26:
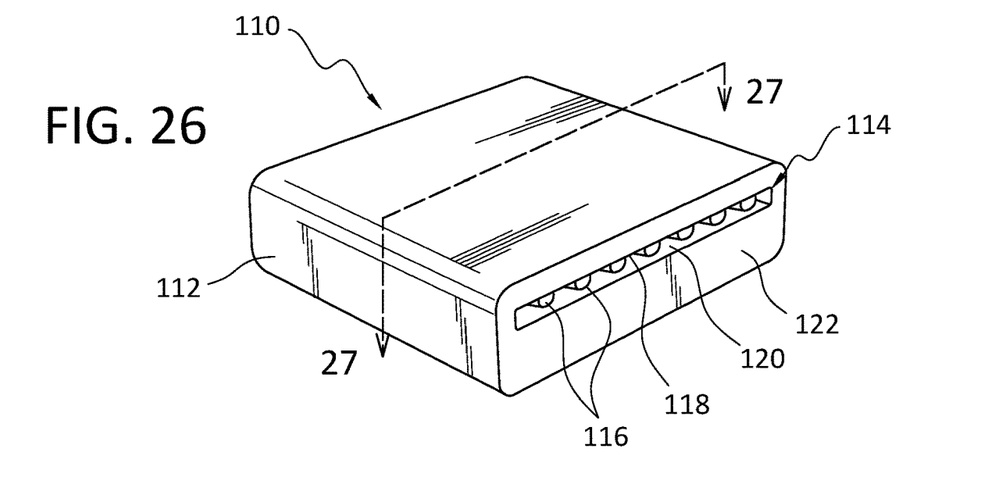
FIG. 26 is a perspective view of a movable magnet retainer of the leash in accordance with the invention.
Figure 27:
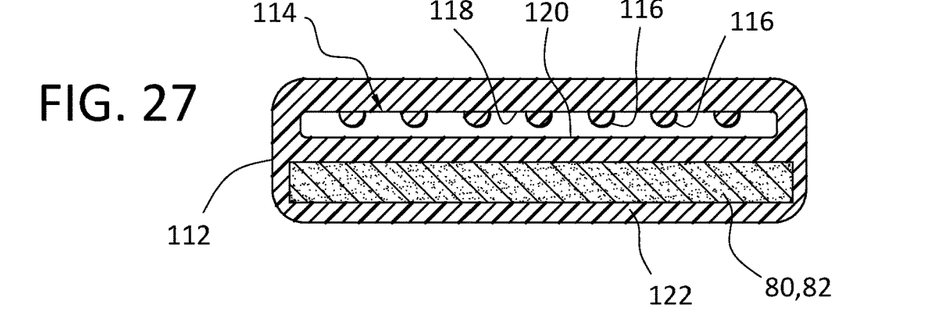
FIG. 27 is a cross-sectional view taken along the line 27-27 of FIG. 26.

FIGS. 26 and 27 show a retainer for magnets 80, 82 as a movable magnet retainer 110 that have an adjustable, user-selectable position along the length of the member 76 so that they can be moved and positioned to align with magnets 78 and 84, respectively when the leash 74 is in a non-use state coiled or wound around the animal's collar 24.

Retainers 110 each include a housing 112 defining a slot 114 extending between opposite sides and having one or more elongate ridges 116 on an inner surface 118 defining the slot 114. The thickness of the slot 114 between the inner surface 118 and an opposing inner surface 120 is selected relative to the thickness of the member 76 to allow for manual sliding of the housing 112 longitudinally along the member 76. The respective magnet 80, 82 is situated in a part 122 of the housing 112 opposite the ridges 116. Slot 114 is dimensioned to be able to accommodate the cross-sectional shape and size of the member 76.

Housings 112 may be installed on the member 76 during its manufacture or possibly afterwards. Once installed on the leash 74, the housings 112 are unable to be slid off of the member 76 in view of the presence of the retainers 90 at the end regions 76a, 76b of the member 76 and also in view of the P-lock 28 at one end which typically has a portion thicker than the member 76.

Each retainer 110 retains one or more magnets in the sense that the respective magnet(s) 80, 82 is secured to a body (housing 112) and moves along with movement of the body. Longitudinal movement of the body along the length of the member 76 by the user causes movement of the magnet 80, 82 to a desired position to enable it to magnetically couple to another magnet (78 or 84, respectively). The manner in which each magnet 80, 82 may be retained by or in the respective retainer 110 is not limited to the disclosed embodiments and any such retention structure may be used in the invention. As shown, the magnets 80, 82 are retained by the respective retainer 110 by being housed within structure of the retainer 110, e.g., a plastic structure that encloses the magnet 80, 82. The invention is however not limited to retaining structure that houses a magnet and it is possible that the magnet may not be entirely enclosed within a structure and thus at least partly exposed. Exposure of the magnet could improve magnetic coupling force.

It is advantageous that magnets 80, 82 be retained by movable retainers 110 or comparable magnet housings because the leash 74 may be used with dogs having different size necks. If the magnets 80, 82 were to be fixed in position, they would be suited for only dogs with a specific neck size. For dogs with larger or smaller neck sizes, the magnets 80, 82 would not align with magnets 78, 84 when the leash 74 is in its coiled or wound state and the leash 74 could not be optimally used, i.e., securely stored around the dog's neck when not in use. Hence, the movability of magnets 80, 82 is important. The alternative would be, if magnets 80, 82 were not movable, to manufacture leashes 74 with magnets 80, 82 at different stationary positions along the length of the member 76 and correlate the positions of the magnets 80, 82 to the neck size of the pet for which the leash 74 is to be used to enable the leash 74 to coil and provide for magnetic coupling for the specific pet neck size. One problem is that if the dog grows, and their neck gets larger, the leash would no longer fit them. Another problem is if the user buys the wrong size leash. Yet another problem is that the leash could not be used on another, different-sized dog.

Figure 28:
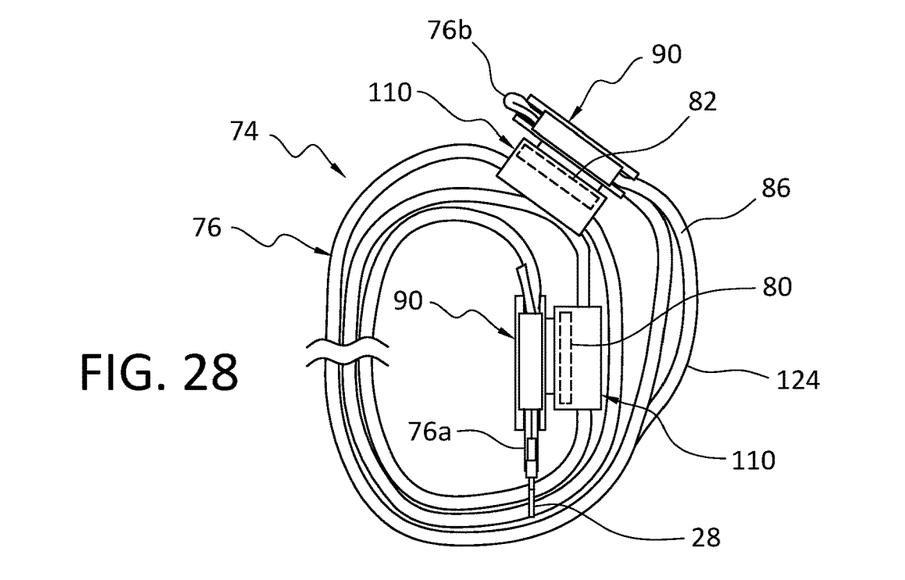
FIG. 28 shows the leash in accordance with the invention coiled up in a non-use state, which would be its state when around an animal's collar and neck.

For use, the user attaches retainers 110 at user-selectable positions and then for a walk, attaches the P-lock 28 to the dog's collar 24 (FIG. 28) and uses the leash 74 in the usual manner. When the walk is over and the user wants to store the leash 74, the user, while preferably keeping the dog 26 in a stationary position, winds the leash 74 around the dog's neck to bring the second magnet 80 into contact with the first magnet 78 (FIG. 28). A portion of the member 76 between the first and second magnets 78, 80 will thus be wound about the dog's collar 24. The user continues this winding motion of the member 76 around the dog's neck until the third magnet 82 is around the dog's neck and further continues the winding motion until the fourth magnet 84 is in contact with the third magnet 82. The member 76 is thus now completely wound around the dog's neck with two magnetic couplings, i.e., between the first and second magnets 78, 80 and between the third and fourth magnets 82, 84. These two magnetic couplings keep the member 76 in a coiled state (FIG. 29).

Figure 29:
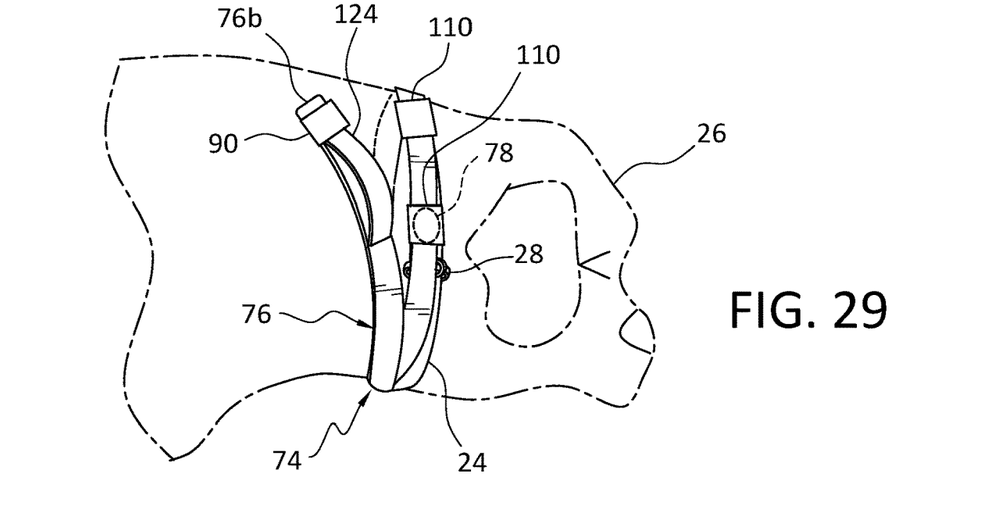
FIG. 29 is a perspective view showing the leash in accordance with the invention around the animal's neck in a partly apart state.

As mentioned above, the orientation, configuration and/or position of the magnets 78, 80, 82, 84 is important to enable the magnetic coupling between magnets 78 and 80 and between magnets 82, 84 when the member 76 is in its coiled, non-use state shown in FIG. 29. To this end, magnets 78, 80, 82, 84 alternate the side of the member 76 they are on. That is, magnets 78 and 82 are situated on one side of the member 76, e.g., the topside shown facing out of the page in FIGS. 20 and 22, while magnets 80, 84 are situated on the opposite side of the member 76, i.e., the underside of bottom side shown facing into the page in FIGS. 20 and 22. With this positioning, magnet 78 on the topside is able to magnetically couple to magnet 80 on the bottom side and magnet 82 on the topside is able to magnetically couple to magnet 84 on the bottom side (FIG. 22). One skilled in the art would readily understand from the disclosure herein how to position and orient the magnet-containing retainers 110 with their polarity to ensure magnetic coupling between magnets 78 and 80 and between magnets 82 and 84. The shape of the magnets 78, 80, 82, 84 may vary from that shown.

Although retainers 90 are designed for use to retain or house the magnets 78, 84, respectively, which will be situated at the end regions 76a, 76b, they may also be used to house magnets 80, 82. This is not a preferred embodiment because it would unnecessarily restrict the ability to easily move magnets 80, 82 along the member 76 to a desired magnetic coupling position with the magnets 78, 84, respectively. Nevertheless, such an embodiment is considered part of the invention.

Variations to the above configurations of magnets 78, 80, 82, 84 are possible. In one configuration, numerous magnets are placed along the entire length of the member 76, for example, sewn into or otherwise fixed to the member 76. The member 76 can then be easily magnetically attached to itself along the entire length when in the non-use state.

Instead of magnets, other cooperating attachment structure may be used, e.g., snaps, buttons, or VELCRO™, which would be positioned at specific locations and possibly in a fixed retainer or housing in or at the end regions 76a, 76b or in movable housings between the end regions 76a, 76b of the member 76.

FIGS. 20-29 herein are essentially the same as FIGS. 1-9 of U.S. patent application Ser. No. 17/076,558 filed Oct. 21, 2020, which is incorporated by reference herein. The features disclosed herein with reference to the embodiments of FIGS. 1-19 can be incorporated into the embodiments of FIGS. 20-29 and vice versa.

Furthermore, although embodiments disclosed above include four magnets, one at each of the two opposite ends or end regions of the member and two movable ones therebetween, it is possible to provide a larger number of magnets or magnet-containing retainers. For example, one or more additional pairs of movable magnets can be provided between the end-situated magnets so that, if one additional pair of magnets is provided, there would be a total of six magnets on the member. When the leash is in its non-use state coiled around the animal's neck, there would thus be three engaged pairs of magnets providing a more secure coil for the leash than if only four magnets were to be provided.

The optimum number of magnets for a leash in accordance with the invention may depend on the length of the leash, with a longer leash having more magnets than a shorter leash. The length of the leash 74 is variable, as represented by the cut lines in FIG. 23. Since the intermediate magnets, i.e., those between the end-situated magnets, can be designed to be removable from engagement with the member, a kit may be provided with the member and at least four removable magnets or any greater even number of magnets. The user then places the number of magnets they feel would be best to enable the leash to be wound around the neck of their pet.

In the magnet retainers 90, 110 disclosed above, there is a magnet that is situated on only one side of the member 76 when the retainer 90, 110 is fixed or movably attached to the member 76 (FIGS. 20 and 22). The side on which the magnet is situated, along with the orientation of the magnet polarity, is important to enable each magnet to magnetically couple to another magnet. However, it is also considered an aspect of the invention that a magnet retainer may be configured to position a single magnet that extends to both sides of the member, e.g., alongside a lateral edge of the member defined between its two major sides. Such a magnet would be able to perform the functionality of two magnets of the leash in accordance with the invention. As such, reciting that a magnet retainer includes or comprises a magnet does not preclude the magnet retainer from including one magnet that uses both of its poles for magnetic coupling to another magnet of the leash 74.

Yet another configuration of a magnet retainer would include two or more magnets, with at least one on each side of the member, e.g., each major side of the member. The magnetic polarity of each of the magnets on a common magnet retainer is oriented to enable the magnet retainer to be magnetically coupled to another magnet retainer requiring the user to only turn the magnet retainer if the magnet retainer does not initially magnetically couple to the other magnetic retainer. As such, reciting that a magnet retainer includes or comprises a magnet does not preclude the magnet retainer from including one or more additional magnets.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. Among other modifications, features of the U.S. patent mentioned above, all of which are incorporated by reference herein, can be used in the leash in accordance with the invention to the extent possible, and all such modifications are considered by the inventor to be part of the invention.

The invention claimed is:

1. An apparatus to enable an elongate leash to coil around an animal's neck when not in use, the leash including a clip at one end region attachable to a collar on the animal, the apparatus comprising:
a plurality of retainers,
each of said retainers including a magnet and first and second parts that have an at least partly separated state that enables placement of a portion of the leash between said first and second parts at any one of a plurality of different, user-selectable locations along a length of the leash and an engaged state in which said first and second parts are fixed to the leash at a user-selected location along the length of the leash,
said retainers being configured with respect to polarity of said magnets thereof to enable said magnets of said retainers to magnetically couple to one another and provide the leash with a coiled state around the animal's neck when not in use.

2. The apparatus of claim 1, wherein said first and second parts define a channel when in the engaged state in which the portion of the leash is situated.

3. The apparatus of claim 1, wherein said first and second parts are completely separated from one another when in the separated state.

4. The apparatus of claim 1, wherein said first part includes first engagement means and said second part includes second engagement means that selectively cooperate with said first engagement means to provide said first and second parts with the separated or engaged state.

5. The apparatus of claim 4, wherein said first and second engagement means snap into one another when transitioning from the separated state to the engaged state.

6. The apparatus of claim 4, wherein said first part is C-shaped and includes a back portion and two flanges that each have a side surface facing the side surface of the opposite flange across a gap, said second part including a housing that retains said magnet, said second engagement means being on said housing.

7. The apparatus of claim 6, wherein said second part defines a cavity on its underside that receives said magnet.

8. The apparatus of claim 6, wherein said first engagement means comprise a longitudinal channel in each of said two flanges that extends between side walls of a housing of said first part and transverse channels that extend from said gap into each of said longitudinal channels, and said second engagement means comprise a pair of projections that extend from each of two side walls of said housing of said second part on opposite sides of said housing, an elongate rod extending between said projections on each side of said housing and an intermediate support projection in a middle region between said projections on each side of said housing, said longitudinal channels and said transverse channels being receivable of said pair of projections, said elongate rod and said intermediate support projection.

9. The apparatus of claim 6, wherein said first engagement means comprise a longitudinally extending channel with an enlarged portion at one end in each of said two flanges, and said second engagement means comprise a contoured projection on each of two side walls of said housing of said second part on opposite sides of said housing, each of said contoured projections including an enlarged region at one end, said longitudinally extending channels each being configured to receive a respective one of said contoured projections when said first and second parts are in the engaged state.

10. The apparatus of claim 6, wherein said first part further comprises a protuberance on an inside surface of said back portion.

11. A leash including the apparatus of claim 1, wherein said plurality of retainers comprise four retainers, a first one of said four retainers being positioned adjacent the clip, a second one of said four retainers being positioned adjacent an opposite end region of the leash and a third and fourth one of said retainers being positioned between said first and second retainers with said third one of said retainers being positioned closer to said first one of said retainers than said fourth one of said retainers,
said magnets of said first, second, third and fourth retainers having a set polarity and being configured to enable said magnets of said first and third retainers to magnetically couple to one another and said magnets of said second and fourth retainers to magnetically couple to one another and provide the leash with the coiled state around the animal's neck when not in use.

12. A leash, comprising:
an elongate member having a first end region and a second end region at an opposite end of said member from said first end region, said member forming a loop at said second end region;
a clip arranged at said first end region of said member and configured to attach to a collar on the animal; and
a magnetic coupling arrangement that provides at least two magnetic couplings between two magnets along the length of said member to provide said member with a coiled state in which said magnetic couplings are present and an extended state in which said magnetic couplings are not present,
said magnetic coupling arrangement including a first magnet at a first end region of said member and a second magnet at a second end region at an opposite end of said member from said first end region.

13. The leash of claim 12, wherein said magnetic coupling arrangement further comprises a third magnet movable longitudinally along said member between said first and second end regions and a fourth magnet movable longitudinally along said member between said first and second end regions, said third and fourth magnets being between said first and second magnets with said third magnet being between said first and fourth magnets,
said third magnet being configured and polarized to magnetically couple to said first magnet when said member is in the coiled state and said fourth magnet being configured and polarized to magnetically couple to said second magnet when said member is in the coiled state.

14. The leash of claim 13, further comprising:
a first movable magnet retainer which retains said first magnet and is movable longitudinally along said member including to a position in said first end region;
a second movable magnet retainer which retains said second magnet and is movable longitudinally along said member including to a position in said second end region;
a third movable magnet retainer on said member between said first and second end regions and that retains said third magnet; and
a fourth movable magnet retainer on said member between said first and second end regions and that retains said fourth magnet.

15. A leash for an animal, comprising:
an elongate member having a first end region and a second end region at an opposite end of said member from said first end region, said member forming a loop at said second end region;
a clip arranged at said first end region of said member and configured to attach to a collar on the animal; and
a plurality of retainers, each of said retainers including a magnet, said retainers being configured with respect to polarity of said magnets therein to enable said magnets of said retainers to magnetically couple to one another and provide the leash with a coiled state around the animal's neck when not in use.

16. The leash of claim 15, wherein at least one of said retainers comprises first and second parts that have an at least partly separated state that enables placement of a portion of said member between said first and second parts at any one of a plurality of different, user-selectable locations along a length of said member and an engaged state in which said first and second parts are fixed to said member at a user-selected location along the length of said member.

17. The leash of claim 16, wherein said first part is C-shaped and includes a back portion, two flanges that each have a side surface facing the side surface of the opposite flange across a gap and first engagement means, and said second part includes a housing that retains said magnet and second engagement means on said housing that selectively cooperate with said first engagement means to provide said first and second parts with the separated or engaged state.

18. The leash of claim 17, wherein said first engagement means comprise a longitudinal channel in each of said two flanges that extends between side walls of a housing of said first part and transverse channels that extend from said gap into each of said longitudinal channels, and said second engagement means comprise a pair of projections that extend from each of two side walls of said housing of said second part on opposite sides of said housing, an elongate rod extending between said projections on each side of said housing and an intermediate support projection in a middle region between said projections on each side of said housing, said longitudinal channels and said transverse channels being receivable of said pair of projections, said elongate rod and said intermediate support projection.

19. The leash of claim 17, wherein said first engagement means comprise a longitudinally extending channel with an enlarged portion at one end in each of said two flanges, and said second engagement means comprise a contoured projection on each of two side walls of said housing of said second part on opposite sides of said housing, each of said contoured projections including an enlarged region at one end, said longitudinally extending channels each being configured to receive a respective one of said contoured projections when said first and second parts are in the engaged state.

20. The leash of claim 15, wherein said plurality of retainers comprise four retainers, a first one of said four retainers being positioned adjacent said clip, a second one of said four retainers being positioned adjacent an opposite end region of said member and a third and fourth one of said retainers being positioned between said first and second retainers with said third one of said retainers being positioned closer to said first one of said retainers than said fourth one of said retainers,
said magnets of said first, second, third and fourth retainers having a set polarity and being configured to enable said magnets of said first and third retainers to magnetically couple to one another and said magnets of said second and fourth retainers to magnetically couple to one another and provide the leash with the coiled state around the animal's neck when not in use.

21. A leash for an animal, comprising:
an elongate member having a first end region and a second end region at an opposite end of said member from said first end region;
a clip arranged at said first end region of said member and configured to attach to a collar on the animal; and
a plurality of retainers,
each of said retainers including a magnet, said retainers being configured with respect to the polarity of said magnets therein to enable said magnets of said retainers to magnetically couple to one another and provide the leash with a coiled state around the animal's neck when not in use,
at least one of said retainers comprising first and second parts that have an at least partly separated state that enables placement of a portion of said member between said first and second parts at any one of a plurality of different, user-selectable locations along a length of said member and an engaged state in which said first and second parts are fixed to said member at a user-selected location along the length of said member.

\* \* \* \* \*